United States Patent Office 3,302,030
Patented Jan. 31, 1967

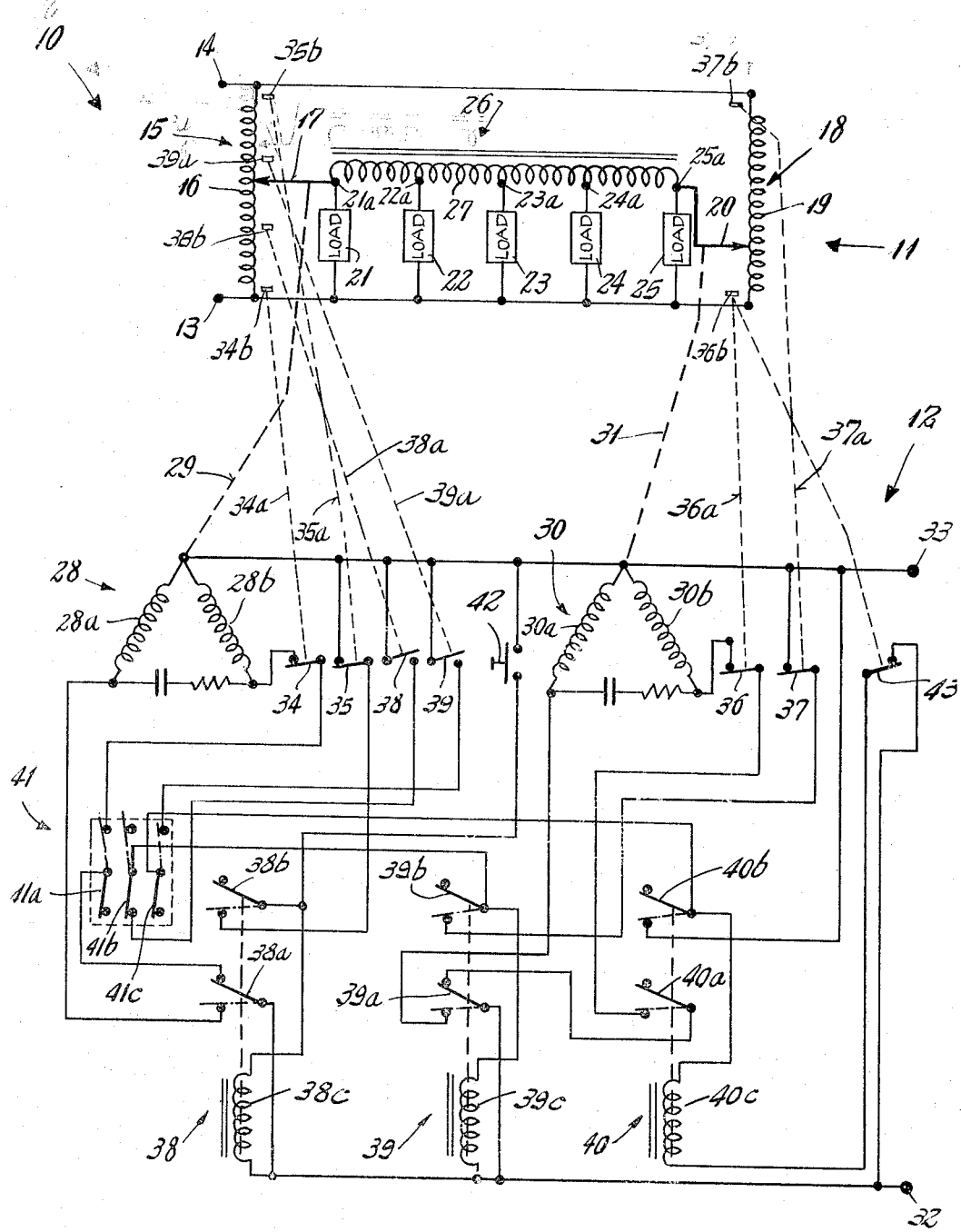

3,302,030
PLURAL TRANSFORMER ELECTRIC LOAD
CONTROL CIRCUIT
Burr G. Deming, Stamford, Conn., assignor to The Superior Electric Company, Hartford, Conn., a corporation of Connecticut
Filed May 23, 1963, Ser. No. 282,657
10 Claims. (Cl. 307—17)

The present invention relates to an electric circuit that controls the electric power to each one of a plurality of individual load circuits and more particularly to such a control circuit that causes the power to each load circuit to be altered according to a predetermined sequence.

In many installations wherein there are a plurality of individual electric load circuits, such as electric heating circuits or lighting circuits, it has been found necessary or desirable to change the output of each load circuit according to a predetermined plan by regulating the electric power to such load circuits. This is especially true where the desired cumulative or total effect of the circuit can be achieved only by the changing of the individual effect from each load circuit. While it is possible to provide an electric control circuit for each individual load circuit, this has not been found to be completely satisfactory for numerous reasons. These reasons include not only the relative high cost of having an individual electrical power control circuit for each circuit but in addition the difficulty of having circuitry for causing each power circuit to function with substantial certainty in accordance with a predetermined plan to achieve the total effect.

It is accordingly an object of the present invention to provide an electric circuit for controlling the power to a plurality of individual load circuits in accordance with a predetermined sequence which does not utilize separate power control circuits for each individual load circuit.

Another object of the present invention is to provide an electric circuit of the above type which is relatively economical for the number of load circuits and electric power controlled and which controls each load circuit according to a predetermined sequence with substantial certainty.

A further object of the present invention is to provide an electric control circuit that controls the electric power to a plurality of load circuits, that achieves the above-noted objects and yet is simple in construction, has relatively few parts and is durable in use.

In carrying out the present invention, there is provided a control circuit which consists of a first voltage means and a second voltage means with each of the voltage means being adjustable. Both voltage means are connected to a source of electrical energy and connected between the two voltage means is a voltage dividing means so that the voltage of one adjustable voltage means is applied at one end of the dividing means and the voltage of the other adjustable voltage means applied at the other end. The voltage dividing means has a plurality of taps spaced at selected voltage increments apart and each load circuit is connected to a tap and to the source. Thus by varying one of the voltage means, the voltage across the dividing means is varied and hence the voltage increment between each load circuit will vary and hence the voltage of each load circuit. When both adjustable voltage means are varied then the voltage increments across the voltage dividing means is determined by the difference in voltage between the two voltage means. Thus the votlage across each load circuit may be changed by changing either one of the adjustable voltage means or both because all of such acts cause the voltage across the voltage dividing means to change.

The present invention further provides for an automatic control of the voltage means so that the adjustment of the voltage is achieved according to a predetermined plan. This is effected by providing an individual motive means for each of the voltage means and by controlling the energization of each of the motive means by the use of a directing circuit which includes limit switches for determining the manner of energization of the motive means.

Other features and advantages will hereinafter appear.

The only figure in the drawing is a schematic diagram of the electric control circuit of the present invention.

Referring to the drawing, the electric control circuit is generally indicated by the reference numeral 10 and includes an electric power control circuit 11 and a directing circuit 12. Referring to the electric power control circuit, there is provided a pair of terminals 13 and 14 to which a first adjustable voltage means 15 which, in the embodiment herein disclosed, specifically consists of a variable autotransformer having a winding 16 on which a brush 17 is movable such that the position of the brush on the winding substantially determines the output voltage between the brush, constituting one of the output terminals, and the input terminal 13, constituting the other output terminal. Also connected in parallel with the first voltage means across the input terminals 13 and 14 is a second voltage means 18 which again, in the embodiment herein described, specifically consists of an adjustable voltage autotransformer having a winding 19 on which a brush 20 is movable. The output from the second voltage means is between the brush 20 and the terminal 13 with the position of the brush 20 along the winding 19 substantially determining the output voltage thereof.

In accordance with the present invention there are a plurality of load circuits which, while they may be any number desired, are specifically shown in the drawing five in number and indicated by the reference numerals 21, 22, 23, 24 and 25 from left to right respectively. One example of a load circuit is a bank of incandescent lights wherein it is desired to control the illumination therefrom by controlling the voltage and/or power to the lights though of course the present invention is not to be considered as limited thereto as it may be employed with other and different kinds of electric load circuits.

Connected between the brushes 17 and 20 of the first and second voltage means 15 and 18 respectively, is a voltage dividing means 26 which, while it may be a resistance for example, is in the embodiment shown an autotransformer winding 27 having taps 21a, 22a, 23a, 24a and 25a from left to right respectively. The taps may be placed at any position desired on the winding to produce the proportional difference in voltage between each of the load circuits of the total voltage across the voltage dividing means. Preferably as it is desired to effect an equal voltage difference between the five load circuits, the taps 21a through 25a are spaced to provide equal increments of the winding therebetween and hence equal voltage difference between the taps. Accordingly the load 21 has one side connected to the tap 21a and its other side to the terminal 13 while the other load circuits 22 through 25 are similarly connected by having one side thereof connected to the taps 22a through 25a respectively and their other sides to the terminal 13.

With this construction it will be appreciated that if the brush 17 of the first voltage means is at a maximum, i.e. in engagement with the terminal 14, and the brush 18 of the second voltage means at a minimum, i.e. in engagement with the terminal 13, then the voltage across the voltage dividing means 26 will be the input voltage at the input terminals 13 and 14. By reason of the equal positioning of the taps 21a through 25a the input voltage will be equally divided so that the load circuit 21a will have full input voltage thereacross while the load circuit 25a has no voltage, with the other three load circuits 22 through 24 having a proportional share between the maximum and minimum voltage thereacross. By varying the position of the two brushes 17 and 20, the total voltage across the voltage divider and hence the difference between the voltage across each of the load circuits may be altered. In addition the load circuits 21 and 25 having the most and least voltage thereacross respectively may be reversed by changing the position of the brushes 17 and 20 so that the brush 20 has a higher potential than the brush 17.

The present invention has found particular utility in controlling lamp loads consisting of incandescent lights wherein it is desired to produce an aesthetic effect by altering the illumination from the lights according to a predetermined plan. One plan involves the sequential step of applying to the voltage dividing means 26, a voltage which is initially zero but increases by increasing the output voltage from the first voltage means 15 to perhaps 40% of the input voltage while maintaining the output voltage from the second voltage means zero. Then at this point increasing the output voltages from both voltage means equally at a predetermined rate until the voltage of the first voltage means achieves a maximum. This maximum voltage is maintained while the output voltage of the second voltage means is increased to a maximum at which point, the voltage across all the load circuits is substantially equal. If desired, the voltage across the load circuits may be decreased in the same manner that they are increased by decreasing the output voltage of the first voltage means until it achieves perhaps 60% of the input voltage while the second voltage means is maintained at a maximum and subsequently decreasing both at the same predetermined rate until the first voltage means reaches and is maintained at zero while the second voltage means is decreased until it too reaches zero output voltage. After a predetermined time, if desired, the above cycle may be repeated.

To cause the electric power control circuit 11 to achieve this predetermined plan there is provided a directing circuit 12. This circuit includes a first reversible motor 28 connected, as diagrammatically shown by the dotted line 29, to the brush 17 to move same and a second reversible motor 30 connected, as diagrammatically shown by the dotted line 31, to the brush 20 of the second voltage means 18. Inphase energization of the windings 28a and 30a of the motors 28 and 30 with alternating current will cause the motors to turn in one direction which moves the brushes 17 and 20 in the direction that increases the output voltage of the voltage means. Inphase energization of the windings 28b and 30b with alternating current causes the motors 28 and 30 to turn in the opposite direction which moves the brushes 17 and 20 respectively to effect a decreasing of the output voltage of the voltage means. For a more complete description of such motors and the operation thereof, reference is had to U.S. Patent No. 2,982,872.

The directing circuit 12 further includes input terminals 32 and 33 which are connectible to a source of alternating current and a plurality of switches, namely normally closed single pole switches 34, 35, 36 and 37 and normally opened single pole switches 38 and 39. The switch 34 has a switch arm 34a, indicated by the dotted line, that is positioned to be operated at the point 34b on the first voltage means by the brush 17 when it is at this position. Similarly the switch 35 has a switch arm 35a that is operated by the brush 17 when it is at the point 35b of the first voltage means and the switches 38 and 39 have switch arms 38a and 39a which are positioned to be operated by the brush 17 in the positions indicated by the reference numerals 38b and 39b respectively on the first voltage means. The switches 36 and 37 have switch arms 36a and 37a which are operated by the brush 20 of the second voltage means 18 at the positions 36b and 37b. The directing circuit 12 further includes three double pole, double throw relays 38, 39 and 40, each having contact arms 38a and 38b, 39a and 39b and 40a and 40b operated by their respective coils 38c, 39c and 40c respectively. In addition, the control circuit has a manually operable three pole, double throw switch 41 having contact arms 41a, 41b and 41c. For energizing and starting the directing circuit to achieve the operation of the power control circuit 11, according to the above-recited predetermined plan, there is provided a momentary start button 42. Also operated at the position 36b of the brush 20 is another normally closed switch 43. The switches and relays are electrically interconnected in the manner shown in the schematic diagram.

Each of the switches is shown in its normal position as are the relay coils while the switch 41 is shown with the contact arms being in the increasing load circuit voltage position.

In the operation of the control circuit with the terminals 32 and 33 being energized and the brushes 17 and 20 being at the positions 34b and 36b which are the positions of the brushes for the minimum value of output voltage from the first and second voltage means, switches 34 and 36 are open, while the relay switches 38, 39 and 40, switch 41 and switches 35, 37, 38 and 39 all have the position of their contact arms in the solid line position shown in the schematic diagram. Momentary manual closure of the starting switch 42 energizes the relay coil 38c causing movement of the switch arms 38a and 38b to their dotted line position. This energizes winding 28a through the contact arm 38a to cause increasing voltage movement of the brush 17 with the motor 30 remaining stationary. After initial movement of the brush 17, the switch 34 becomes closed enabling the starting button 42 to be released as the coil 38c is maintained energized by a holding circuit through the switch arm 38b and switch 35. The motor 28 moves the brush 17 at a predetermined rate to continually increase the output voltage from the first voltage means and when the brush 17 achieves the position 38b it closes switch 38 which causes a circuit to be established through the switch 38 and switch arm 41b to energize the relay coil 39c. This causes the switch arms 39a and 39b to assume their dotted line position which enables winding 30a to be energized with inphase alternating current through the switch arm 39a. The motor 30 turns to move the brush 20 to increase the output voltage from the second voltage means at a predetermined rate. Preferably both the brushes 17 and 20 are moved at the same rate and as the voltage means are also preferably identical, the voltage across the voltage dividing means will remain substantially constant to maintain the voltage difference between each load circuit the same even though the voltage across each circuit is increasing at the same rate.

The two brushes are continuously moved until the brush 17 attains the position 35b which is the position of the brush 17 which produces the maximum value of output voltage from the first voltage means, where it opens the switch 35 causing deenergization of the relay coil 38c and subsequent deenergization of the motor 28. However, the brush 20 continues movement until it reaches the position 37b which is the position of the brush 20 which produces the maximum value of output voltage from the second voltage means where switch 37 is opened causing deenergization of the relay coil 39 and the motor 30. The voltage across each load circuit is thus substantially equal and at its maximum.

The maximum value of voltage across the load circuits will be continued until it is desired to effect a decreasing thereof. This is achieved by the manual operation of the switch 41 to cause the switch arms 41a, 41b and 41c to assume their dotted line position. Winding 28b through switch 34 and contact arms 41a and 38a becomes energized with inphase alternating current which initiates the downward movement or decreasing voltage movement of the brush 17. The brush 20 remains stationary until the brush 17 reaches the position 39b where it closes switch 39 which establishes a circuit through switch 39, contact arm 41c, coil 40c and switch 43 effects energization of the coil 40c to move the contact arms 40a and 40b to their dotted line position. This establishes a holding circuit for the coil 40c through the contact arm 40b and switch 43. Winding 30b thus becomes energized with inphase alternating current through the switch 36, contact arms 40a and 39a which causes the brush 17 to begin movement to decrease the output voltage of the second voltage means. Movement of the two brushes continues, preferably at the same decreasing rate as the increasing output voltage rate until the brush 17 reaches the position 34b where it causes switch 34 to open to deenergize the motor 28. However, the brush 20 continues movement until it reaches the position 36b where it opens switches 36 and 43 stopping the motor 30 and deenergizing coil 40c. The parts are thus in the position which they had at the original initiation of the cycle. The cycle may be repeated by operation of the starting switch 42.

While the above disclosed directing circuit 12 requires manual operation of the switches 41 and 42 to begin the decreasing movement and increasing movement of the brushes respectively, it will be appreciated that these switches may be operated by timing motors for automatic operation. Moreover, while the input terminals 13 and 14 are shown in the specific embodiment of the invention herein described as being connected to a single phase source of alternating current, it will be appreciated that the input to the autotransformer 15 may be connected to one phase of a three phase A.C. source and the input to the autotransformer 18 to a different phase, if desired.

It will accordingly be appreciated that there has been disclosed an electric power control circuit that is composed of only a few parts that provides for adjusting the voltage across each of a plurality of load circuits. The power control circuit includes a first and second adjustable voltage means and a voltage dividing means that subdivides the output voltage difference between the two adjustable voltage means into incremental voltage values that exist between different load circuits. Thus by altering the output voltage from either one or both of the adjustable voltage means, the incremental voltage difference between the load circuits may be also altered. In addition the present invention provides for a directing circuit that controls the changing of the output voltage from the adjustable voltage means in accordance with a predetermined plan.

Variations and modifications may be made within the scope of the claims and portions of the improvements may be used without others.

I claim:

1. An electric control circuit for controlling the electrical energy to a plurality of individual load circuits comprising input terminals connectible to a source of electrical energy, a first voltage means connected to said input terminals and having output terminals across which an output voltage appears, a second voltage means connected to said input terminals and having output terminals across which an output voltage appears, a voltage dividing means connected across similar output terminals of said first and second voltage means and having a plurality of taps at different voltage positions, a plurality of load circuits, with the taps dividing the voltage difference between the values of output voltages of the first and second voltage means in a constant ratio at the different voltage positions, means connecting one side of the load circuits to one of the taps, one to one, and means connecting the other sides of the load circuits to the other output terminals of the first and second voltage means.

2. An electric control circuit for controlling the electrical energy to a plurality of individual load circuits comprising input terminals connectible to a source of electrical energy, a first adjustable voltage means connected to said input terminals and having output terminals across which said adjustable voltage appears, a second adjustable voltage means connected to said input terminals and having output terminals across which said adjustable voltage appears, a voltage dividing means connected across similar output terminals of said first and second adjustable voltage means and having a plurality of taps at different voltage positions with the taps dividing the voltage difference between the values of output voltages of the first and second voltage means in a constant ratio at the different voltage positions, at least one load circuit having one side connected to one of the taps, and means connecting the other side of the load circuit to the other output terminals of the first and second voltage adjusting means whereby the voltage across the load circuit may be adjusted by either or both of the adjustable voltage means.

3. An electric control circuit for controlling the electrical energy to a plurality of individual load circuits comprising input terminals connectible to a source of electrical energy, a first adjustable voltage means connected to said input terminals and having output terminals across which said adjustable voltage appears, a second adjustable voltage means connected to said input terminals and having output terminals across which said adjustable voltage appears, a voltage dividing means connected across similar output terminals of said first and second adjustable voltage means and having a plurality of taps at different voltage positions with the taps dividing the voltage difference between the values of output voltages of the first and second voltage means in a constant ratio at the different voltage positions, a plurality of load circuits, means connecting one side of the load circuits to one of the taps, one to one, and means connecting the other sides of the load circuits to the other output terminals of the first and second voltage adjusting means whereby the voltage across the load circuit may be adjusted by either or both of the adjustable voltage means.

4. An electric control circuit for controlling the electrical energy to a plurality of individual load circuits comprising input terminals connectible to a source of electrical energy, a first adjustable voltage autotransformer connected to said input terminals and having output terminals across which said adjustable voltage appears with one of said output terminals being connected to a movable brush means, a second adjustable voltage autotransformer connected to said input terminals and having output terminals across which said adjustable voltage appears with one of said output terminals being connected to a movable brush means, a voltage dividing means connected across the output terminals of said first and second adjustable voltage means that are connected to the movable brush means and having a plurality of taps at different voltage positions with the taps dividing the voltage difference between the values of output voltages of the first and second voltage means in a constant ratio at the different voltage positions at least one load circuit having one side connected to one of the taps, and means connecting the other side of the load circuit to the other output terminals of the first and second adjustable voltage means whereby the voltage across the load circuit may be adjusted by either or both of the adjustable voltage means.

5. The invention as defined in claim 4 in which the voltage dividing means includes a transformer winding with the taps spaced at different positions on said winding.

6. An electric control circuit for controlling the electrical energy to a plurality of individual load circuits comprising input terminals connectible to a source of electrical energy, a first adjustable voltage means connected to said input terminals and having output terminals across which said adjustable voltage appears, a second adjustable voltage means connected to said input terminals and having output terminals across which said adjustable voltage appears, a voltage dividing means connected across similar output terminals of said first and second adjustable voltage means and having a plurality of taps at different voltage positions, with the taps dividing the voltage difference between the values of output voltages of the first and second voltage means in a constant ratio at the different voltage positions, at least one load circuit having one side connected to one of the taps, means connecting the other side of the load circuit to the other output terminals of the first and second voltage adjusting means, motive means for adjusting said first adjustable voltage means, and a directing circuit for energizing said motive means to change the output voltage of the adjustable voltage means from a first value to a second value whereby the voltage across the load circuit is adjusted by the adjustable voltage means.

7. An electric control circuit for controlling the eletrical energy to a plurality of individual load circuits comprising input terminals connectible to a source of electrical energy, a first adjustable voltage means connected to said input terminals and having output terminals across which said adjustable voltage appears, a second adjustable voltage means connected to said input terminals and having output terminals across which said adjustable voltage appears, a voltage dividing means connected across similar output terminals of said first and second adjustable voltage means and having a plurality of taps at different voltage positions with the taps dividing the voltage difference between the values of output voltages of the first and second voltage means in a constant ratio at the different voltage positions, at least one load circuit having on side connected to one of the taps, means connecting the other side of the load circuit to the other output terminals of the first and second voltage adjusting means, a first motive means for adjusting said first adjustable voltage means, second motive means for adjusting said second adjustable voltage means, and a directing circuit for energizing said first motive means to change the output voltage of the first adjustable voltage means from a first value to a second value and energizing said second motive means to change the output voltage of the second adjustable voltage means from a first value to a second value whereby the voltage across the load circuit is adjusted by adjusting the adjustable voltage means.

8. An electric control circuit for controlling the electrical energy to a plurality of individual load circuits comprising input terminals connectible to a source of electrical energy, a first adjustable voltage means connected to said input terminals and having output teminals across which said adjustable voltage appears, a second adjustable voltage means connected to said input terminals and having output terminals across which said adjustable voltage appears, a voltage dividing means connected across similar output terminals of said first and second adjustable voltage means and having a plurality of taps at different voltage positions with the taps dividing the voltage difference between the values of output voltages of the first and second voltage means in a constant ratio at the different voltage positions, at least one load circuit having one side connected to one of the taps, means connecting the other side of the load circuit to the other output terminals of the first and second voltage adjusting means, first motive means for adjusting said first adjustable voltage means, second motive means for adjusting said second adjustable voltage means, and a directing circuit for energizing said first motive means to change the output voltage of the first adjustable voltage means from a first value to a second value and energizing said second motive means to change the output voltage of the second adjustable voltage means from a first value to a second value at an intermediate value of output voltage of the first adjustable voltage means whereby the voltage across the load circuit may be adjusted by either or both of the adjustable voltage means.

9. An electric control circuit for controlling the electrical energy to a plurality of individual load circuits comprising input terminals connectible to a source of electrical energy, a first adjustable voltage means connected to said input terminals and having output terminals across which said adjustable voltage appears, a second adjustable voltage means connected to said input terminals and having output terminals across which said adjustable voltage appears, a voltage dividing means connected across similar output terminals of said first and second adjustable voltage means and having a plurality of taps at different voltage positions with the taps dividing the voltage difference between the values of output voltages of the first and second voltage means in a constant ratio at the different voltage positions, at least one load circuit having one side connected to one of the taps, means connecting the other side of the load circuit to the other output terminals of the first and second voltage adjusting means, first motive means for adjusting said first adjustable voltage means, second motive means for adjusting said second adjustable voltage means, and a directing circuit for energizing said first motive means to increase the output voltage of the first adjustable voltage means from a first value to a second value and energizing said second motive means to increase the output voltage of the second adjustable voltage means from a first value to a second value at an intermediate value of output voltage of the first adjustable voltage means and for decreasing the output voltage of the first adjustable voltage means from the second value to the first value and energizing said second motive means to decrease the output voltage of the second adjustable voltage means from the second value to the first value at an intermediate value of the output voltage of the first adjustable means whereby the voltage across the load circuit may be adjusted by either or both of the adjustable voltage means.

10. An electric control circuit for controlling the electrical energy to a plurality of individual load circuits comprising input terminals connectible to a source of electrical energy, a first adjustable voltage autotransformer connected to said input terminals and having output terminals across which said adjustable voltage appears with one of said output terminals being connected to a movable brush means, a second adjustable voltage autotransformer connected to said input terminals and having output terminals across which said adjustable voltage appears with one of said output terminals being connected to a movable brush means, a transformer winding connected across similar output terminals of said first and second adjustable voltage means and having a plurality of taps at different positions on said winding with the taps dividing the voltage difference between the values of output voltages of the first and second voltage means in a constant ratio at the different voltage positions, at least one load circuit having one side connected to one of the taps, means connecting the other side of the load circuit to the other output terminals of the first and second voltage adjusting means, first motive means for adjusting said first adjustable voltage means, second motive means for adjusting said second adjustable voltage means, and a directing circuit for energizing said first motive means to change the output voltage of the first adjustable voltage means from a first value to a second value and energizing said second motive means to change the output voltage of the second adjustable voltage means from a first value to a second value at an intermediate value of output voltage of the first adjustable voltage means whereby the voltage across the load circuit may be adjusted by either or both of the adjustable voltage means, said directing circuit including a pair of switches for each adjustable autotransformer with the switches being spaced apart and positioned in the path of movement of the movable brush means, the position of said switches determining the first and second values of the output voltage for each adjustable autotransformer.

References Cited by the Examiner

UNITED STATES PATENTS

| | | | |
|---|---|---|---|
| 823,220 | 6/1906 | Jackson | 307—15 X |
| 1,824,572 | 9/1931 | Roberts | 315—163 X |
| 2,285,978 | 6/1942 | Hunter | 307—37 X |
| 2,345,135 | 3/1944 | Lippman | 307—157 |
| 2,604,498 | 7/1952 | Volgouskoy | 307—24 |
| 2,753,467 | 7/1956 | Pinney | 307—55 X |
| 2,780,735 | 2/1957 | Minneci | 307—83 |

ORIS L. RADER, *Primary Examiner.*

T. J. MADDEN, *Assistant Examiner.*